July 8, 1969 W. S. EVERETT 3,454,129
SOUND MUTING AND FILTERING DEVICE
Filed Oct. 10, 1967

INVENTOR.
WILHELM S. EVERETT
BY *Elliott & Pastoriza*
ATTORNEYS

United States Patent Office 3,454,129
    Patented July 8, 1969

3,454,129
    SOUND MUTING AND FILTERING DEVICE
    Wilhelm S. Everett, 126 W. Santa Barbara St.,
    Santa Paula, Calif. 93060
    Filed Oct. 10, 1967, Ser. No. 674,298
    Int. Cl. F01n *1/08*
    U.S. Cl. 181—56                                  10 Claims

ABSTRACT OF THE DISCLOSURE

An improved sound muting and filtering device is provided for high velocity gases normally exhausted to atmosphere from relief valves, blow down stacks, steam turbine exhausts, and the like. The muting device comprises an elongated shell having an inlet pipe connected to the relief valve or other gas exhaust and incorporates a partition and tube assembly structure for passing the high velocity entering gases to atmosphere through an upper outlet head means. The lower portion of the shell and lower end of the partition and tube assembly structure define an inlet expansion chamber incorporating a gas passage means defining a plurality of small openings receiving the high velocity inlet gases and directing the gases laterally through the plurality of openings. The relatively smaller diameters of each of the openings compared to the diameter of the inlet pipe results in a substantial increase in the dominant noise frequency of the gases received in the inlet expansion chamber. As a result, the remaining components are more effective in muting the high frequency noises and can also be made smaller and still be properly related to the wavelengths of the dominant noise frequencies.

---

This invention relates to an improved sound muting and filtering device over that shown and described in my United States Patent No. 2,998,860.

The apparatus of my prior patent as well as the device of this invention are used for attenuating noise generated by high velocity gases passing from exhaust outlets to atmosphere. For example, the invention finds utility when used with relief valves, steam turbine exhausts and other similar type gas vents. All of the various objects and advantages of the apparatus described in my above referred to patent are realized by the present device with the addition of improved silencing features.

More particularly, and as is well known to those skilled in the art, the effectiveness of a physical structure in silencing certain noise frequencies depends upon proper dimensioning of various components within the structure relative to the wavelengths of the dominant noise frequencies involved. If the noise is of relatively low frequency, the wavelengths are appreciable and a relatively large structure is necessary. Such structures may be economically unfeasible. Some compromise must thus be effected in the design of a usable muting device with respect to proper muting of certain lower frequency bands. Problems also arise in the attenuation of high frequencies. For example, many of the devices employ straight through tube structures which is desirable to minimize back pressure but which, on the other hand, permits line of sight noise, particularly prevalent at high frequencies, to escape.

With the foregoing considerations in mind, it is a primary object of the present invention to provide an improved sound muting and filtering device over that shown and described in my U.S. Patent No. 2,998,860 wherein a more effective noise attenuation for both low and high frequency noise bands is realizable.

More particularly, it is an object to provide an improved sound muting and filtering device incorporating unique means for essentially "re-shaping" the frequency characteristic of the noise inherent in the exhausting gas in such a manner that more effective attenuation of such noise can be effected by the remaining components of the device, and wherein proper dimensioning is economically feasible.

Briefly, these and other objects and advantages of this invention are attained by providing a muting and filtering device similar in construction to portions of that shown in my referred to United States patent. This structure essentially comprises an elongated cylindrical shell incorporating a partition and tube assembly, an inlet pipe or nozzle at its lower end, and an upper outlet head means defining an upper concave surface serving as a reflector for directing outlet gas noise from the upper end of the device straight upwardly. The tube assembly includes a plurality of elongated perforated tubes extending from an inlet expansion chamber defined in the lower end of the shell directly to the upper outlet head means. Sound absorbent material is incorporated between the various tubes. The length to diameter ratio of the tubes is dimensioned for optimum attenuation of the dominant noise frequencies involved.

In accord with important features of the present invention, the lower inlet expansion chamber incorporates a gas passage means defining a plurality of openings which serve to provide communication between the inlet pipe and the inlet expansion chamber, the inlet high velocity gases being diverted to pass laterally through these openings. The diameter of each of the openings is substantially less than the diameter of the inlet pipe such that the frequency of the issuing gas into the expansion chamber is greatly increased. Attenuation of the resulting high frequency noises can better be accomplished within a given physical size for the various components of the unit than for lower frequencies. Thus, as one example by rearranging the frequency characteristic, the concave upper reflecting surface defined by the upper outlet head means has a diameter appreciably greater than the wavelength of the higher frequency noises signals with a consequence of better directivity in a vertically upward direction.

In addition, certain of the tubes making up the tube assembly are tilted slightly with respect to the axis of the shell so that line of sight escape of noise is inhibited.

A better understanding of the present inveniton will be had by now referring to the accompanying drawings, in which.

Figure 1:
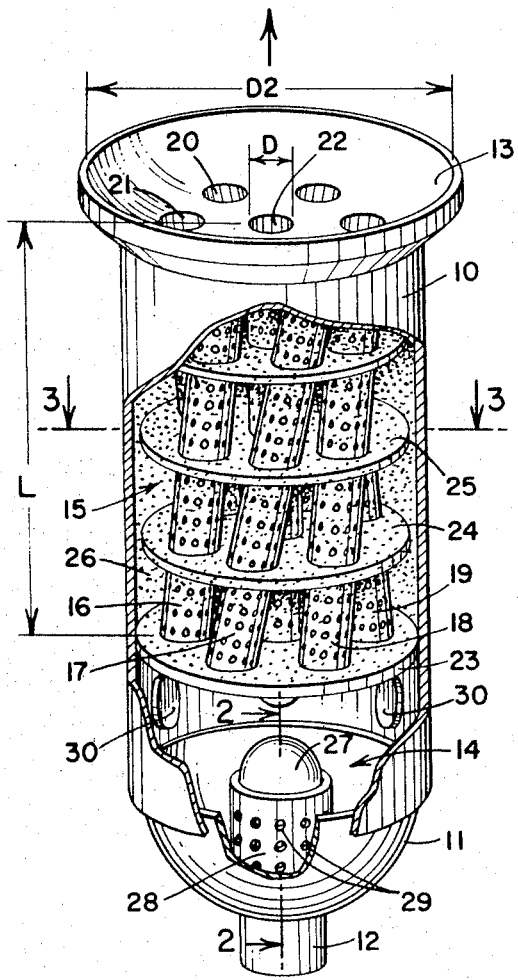
FIGURE 1 is a cutaway perspective view of a first embodiment of the sound muting and filtering device of this invention.

Referring first to FIGURE 1 the device comprises an elongated shell 10 having a lower head means 11 receiving an inlet pipe 12, and an upper outlet head means 13 defining an upper concave reflecting surface. The lower portion of the cylindrical shell 10 defines with the lower head means 11 an inlet expansion chamber 14. Above the chamber 14 there is provided a partition and tube assembly means designated generally by the arrow 15. This assembly includes a plurality of perforated tubes 16, 17, 18, 19, 20, 21, and 22. The latter three tubes are designated at the upper end of the drawing at their outlets in the upper head means 13. Preferably, there are provided a total of seven such perforated tubes, six of these tubes 16 through 21 being tilted and circumferentially surrounding a central straight tube 22. The lower ends of each of the tubes are supported in a tube base plate 23 with their lower inlets in direct communication with the inlet expansion chamber 14. The upper ends of the tubes are respectively welded to registering openings in the upper head means 13 with the outlets of the six surrounding tubes circumferentially displaced relative to their inlets in the base supporting plate 23. These upper outlet ends communicate directly with the atmosphere.

Preferably a plurality of intermediate partitions are provided such as indicated at 24 and 25 for the tube assembly. Each of these partitions is disc shaped and of a diameter slightly smaller than the inside diameter of the shell 10 to leave an annular gap. The space between the exterior of the various tubes and the lower base support plate 23 and upper head means 13 is filled with sound absorbent material 26. As in the tube structure described in my referred to patent, the dimensioning of the various tubes is such that their length L to diameter D ratios lie between 4 to 1 and 6 to 1. Tilting of the majority of the tubes avoids line of sight escape of noise through the structure.

Referring now to the lower portion inlet expansion chamber 14, there is provided a unique gas passage means made up of a hemispherically shaped closed end 27 and cylindrical curved plate 28 defining an annular wall having a plurality of small diameter openings 29.

Figure 2:
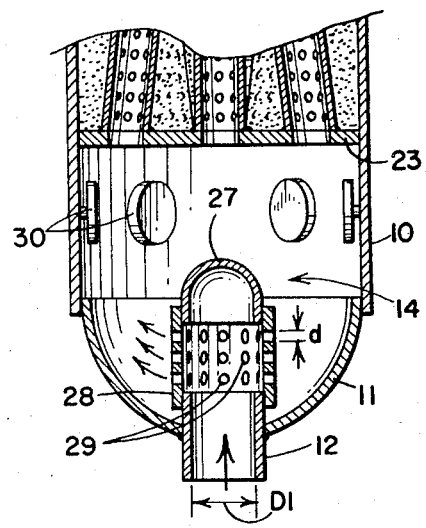
FIGURE 2 is a fragmentary cross section taken generally in the direction of the arrows 2—2 of FIGURE 1.

With particular reference to FIGURE 2, it will be evident that incoming gases received in the inlet pipe 12 will impinge against the hemispherical end closure 27 and be diverted laterally through the very small openings 29 in the curved plate 28. The diameter of each of the openings is designated $d$ and this diameter is substantially smaller than the inlet diameter D1 of the inlet pipe 12 and also the diameter D of the various perforated tubes. On the other hand, the total cross-sectional area of the plurality of openings 29 is preferably made at least equal to the cross-sectional area of the inlet pipe 12.

It will be noted in both FIGURES 1 and 2 that the inner annular wall of the inlet expansion chamber 14 includes a plurality of circular discs 30 disposed with their planes generally parallel to the axis of the cylindrical shell. As an economy in manufacture, these discs may simply constitute the cutouts from the openings in the upper head means 13 accommodating the upper outlet ends of the various tubes. Securement of the discs to the inside annular wall of the expansion chamber as illustrated serves to effect further deadening of sound in this portion of the apparatus.

Figure 3:
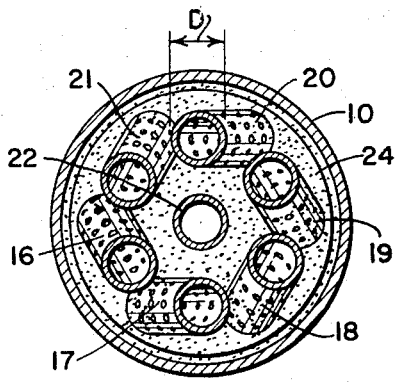
FIGURE 3 is a cross seciton taken in the direction of the arrows 3—3 of FIGURE 1.

FIGURE 3 illustrates the effect of tilting of the various six outer tubes of the tube assembly wherein it will be evident that line of sight noises are effectively blocked for gases exhausting through these tubes. Further, the small annular gap left between the disc shaped partitions such as the partition 24 relative to the inner wall of the shell 10 will be evident.

Figure 4:
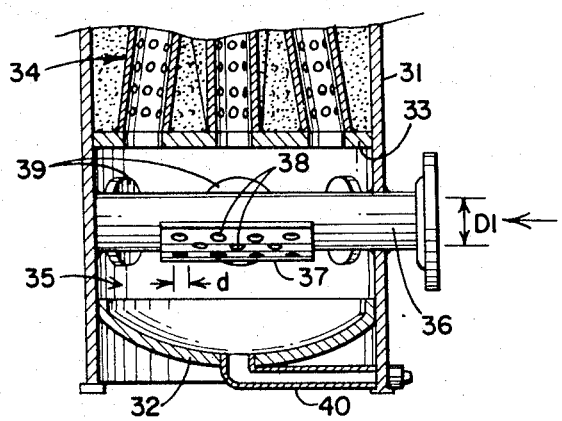
FIGURE 4 is a fragmentary view, partly in cross section of a modified embodiment of the invention.

Referring now to FIGURE 4, there is shown a modified embodiment wherein the inlet pipe is brought in through the lower side of the shell rather than axially within the bottom portion. Thus, in FIGURE 4 there is provided a cylindrical shell 31 having a lower head means 32 and a perforated tube supporting base plate 33 for a tube assembly 34 which may be similar to the tube assembly 15 described in FIGURE 1. An inlet expansion chamber 35 is defined between the lower head 32 and tube supporting base plate 33 and the annular lower wall portion of the shell 31.

In the embodiment of FIGURE 4, the inlet pipe is shown at 36 extending laterally through the lower wall portion of the shell 31 and extending diametrically across the expansion chamber 35 to terminate at the far wall of the shell. A gas passage means in the form of a curved plate 37 in turn fits over a suitable cutout portion of the inlet pipe 36 within the expansion chamber and extends over a lower circumferential 180° of the inlet pipe. This curved plate 37 includes a plurality of openings 38 each of a small diameter $d$ corresponding to the diameter of the various openings 29 in the structure described with respect to FIGURES 1 and 2. Again, the total cross-sectional areas of the various openings 38 are preferably made at least equal to the cross-sectional area of the inlet pipe 36.

With this modified structure, it is possible to readily incorporate a drain pipe 40 from the lower end of the header 32 for draining any liquid that may accumulate during the operation of the device.

In the operation of the sound muting and filtering device, the inlet pipe 12 in the embodiment of FIGURE 1 or 36 in the embodiment of FIGURE 4 is secured directly to the exhaust vent or other high velocity gas outlet such that the gases are passed directly against the closed end of the inlet pipe. In the case of FIGURE 1, this closed end would constitute the inner hemispherical surface of the dome structure 27 and in the case of FIGURE 4, the closed end would be defined by the far wall of the shell. The incoming gases are thus diverted laterally to pass out through the various openings in the curved plate structures described in the two embodiments.

The noise frequencies generated by the gases passing from the openings will be greatly increased. This phenomenon is a consequence of the fact that for high velocity flowing gases the following formula applies:

$$f = S \cdot V / d$$

where $f$ is the noise frequency, $S$ is equal to Struhul's number, $V$ is the velocity of the gas, and $d$ is the diameter of the opening through which the gas passes. Since $d$ is considerably smaller than the diameter of the inlet pipe D1 it will be evident from the above formula that the frequency is greatly increased. This reshaping of the frequency characteristic of the incoming dominant noises to a higher value of frequency results in improved attenuation of these frequencies in the remaining components of the muting device since the dimensions of the components relative to the decreased wavelengths become more effective. The tilting of the tubes as described is important in that it avoids line of sight escape of noise which is a more serious problem at higher frequencies because of the greater directivity involved. On the other hand, the effectiveness of the reflector surface on the upper head means 13 is also increased in that the overall diameter of this reflector D2 is effectively increased when measured in wavelengths of the higher frequency noises. As a consequence, this improved reflectivity directs any noises in a more vertical line and thus aids greatly in muting the sound propagated to surrounding areas by directing this sound upwardly.

From the foregoing description, it will be evident that the provision of the end closure and wall having the plurality of openings to provide communication between the incoming gases in the inlet pipe and the expansion chamber effectively results in a greatly improved overall sound muting and filtering device. Thus, all of the various objects of the present invention are fully realized by this invention as described.

What is claimed is:

1. A sound muting and filtering device for gases comprising, in combination: a shell; a lower head means defining with a lower portion of said shell an inlet expansion chamber; an upper outlet head means on said shell communicating with the atmosphere; a tube assembly disposed in said shell including at least one perforated tube having one end communicating with said inlet expansion chamber and its other end passing said through upper outlet head means; an inlet pipe passing into said inlet expansion chamber; and a gas passage means positioned on a portion of said inlet pipe in said chamber and defining a plurality of openings each of diameter substantially less than the inside diameter of said inlet pipe and perforated tube to provide communication between said inlet pipe and inlet expansion chamber whereby the dominant noise frequency of high velocity gases passing into said inlet expansion chamber from said inlet pipe and through said tube assembly to exhaust from said upper outlet head means to atmosphere, is substantially increased over its value in the absence of said gas passage means.

2. A device according to claim 1, in which said upper outlet head means defines an upwardly facing concave reflecting surface of diameter substantially greater than said diameter of said perforated tube and of a value greater than the wavelength of said dominant frequency whereby noise is directed upwardly by said reflecting surface.

3. A device according to claim 1, in which said inlet pipe terminates in a closed end in said chamber, said gas passage means comprising a curved plate defining at least a part of the circumferential wall of said portion of said inlet pipe, said openings being formed in said plate so that entering high velocity gas is diverted by said closed end and caused to pass laterally of the axis of said pipe through said openings, the total cross-sectional areas of all of said openings in said plate being equal to the cross-sectional area of said inlet pipe.

4. A device according to claim 3, in which said inlet pipe extends into the bottom of said chamber in coaxial relationship with the axis of said shell, said closed end being defined by a hemispherically shaped cap, and said curved plate extending circumferentially over 360° of said inlet pipe portion so that said gas is directed radially outwardly from said axis of said shell.

5. A device according to claim 3, in which said inlet pipe extends into the side of said chamber at right angles to the axis of said shell diametrically across said chamber to terminate at the inner far wall of said shell, said far wall defining said closed end, said curved plate extending circumferentially over 180° of the bottom half of said inlet pipe portion in said chamber so that said gas is directed towards the lower end of said chamber to impinge upon said lower head means.

6. A device according to claim 1, including a plurality of discs secured in said chamber circumferentially about the interior side wall of said lower portion of said shell with their planes parallel to the axis of said shell to provide a deadening of noise in said chamber.

7. A device according to claim 5, including a lower drain pipe extending from the bottom of said lower head means.

8. A device according to claim 1, in which said tube assembly includes a center tube and six surrounding outer tubes; a tube supporting base plate secured in said shell and defining the upper wall of said chamber and including openings receiving the lower ends of said tubes, said upper outlet head means having openings registering with the upper ends of said tubes, the axes of said outer tubes being tilted such that their outlets are circumferentially displaced from their inlets relative to said center tube, all of said tubes being perforated; and a sound absorbent material filling said shell between said tube supporting base plate and said upper outlet head means.

9. A device according to claim 8, in which there is provided at least one disc shaped partition intermediate said tube supporting base plate and said upper outlet head means, said partition being normal to the axis of said shell and of a diameter less than the internal diameter of said shell to leave an annular gap between the periphery of said partition and the interior wall of said shell.

10. A device according to claim 8, in which the total cross sectional area of said perforated pipe is greater than the cross sectional area of said inlet pipe and in which each of said perforated pipes has a length to diameter ratio between the limits of 4 to 1 and 6 to 1, whereby substantial noise attenuation is achieved by flow of gases therethrough.

References Cited
UNITED STATES PATENTS

| | | | |
|---|---|---|---|
| 593,970 | 11/1897 | Schwarm | 181—57 |
| 2,329,101 | 9/1943 | Chipley | 181—58 XR |
| 2,389,988 | 11/1945 | Leadbetter | 181—57 XR |
| 2,912,062 | 11/1959 | Hoyle | 181—57 XR |
| 2,998,860 | 9/1961 | Everett | 181—56 XR |

FOREIGN PATENTS

| | | |
|---|---|---|
| 742,868 | 1/1933 | France. |
| 606,572 | 12/1934 | Germany. |
| 934,031 | 10/1955 | Germany. |

ROBERT S. WARD, JR., *Primary Examiner.*

U.S. Cl. X.R.

181—57, 58, 60